R. A. BROWN & F. M. ARNOLD.
AUTOMOBILE CURTAIN HANGING DEVICE.
APPLICATION FILED DEC. 13, 1915.
1,236,143.
Patented Aug. 7, 1917.
4 SHEETS—SHEET 1.
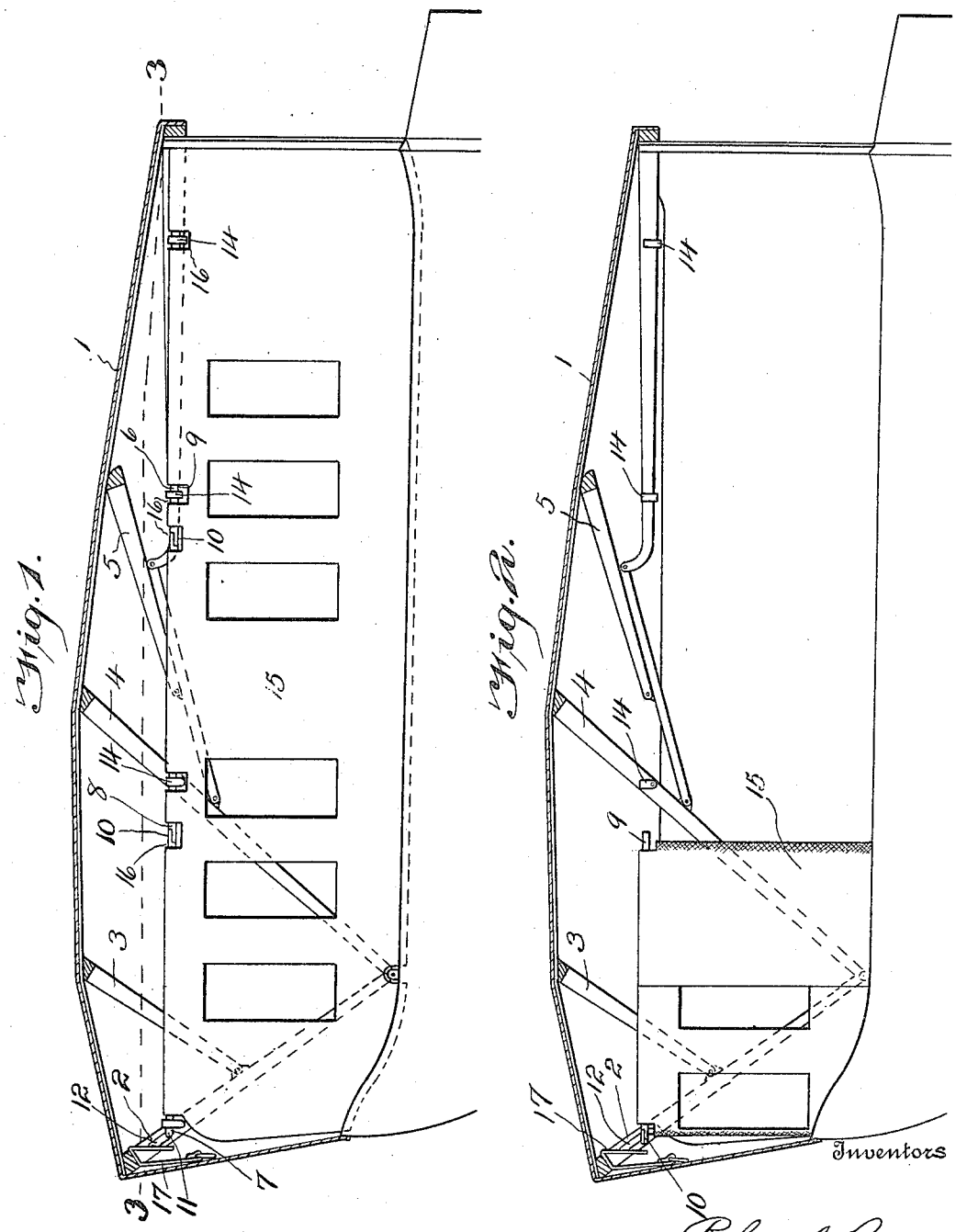

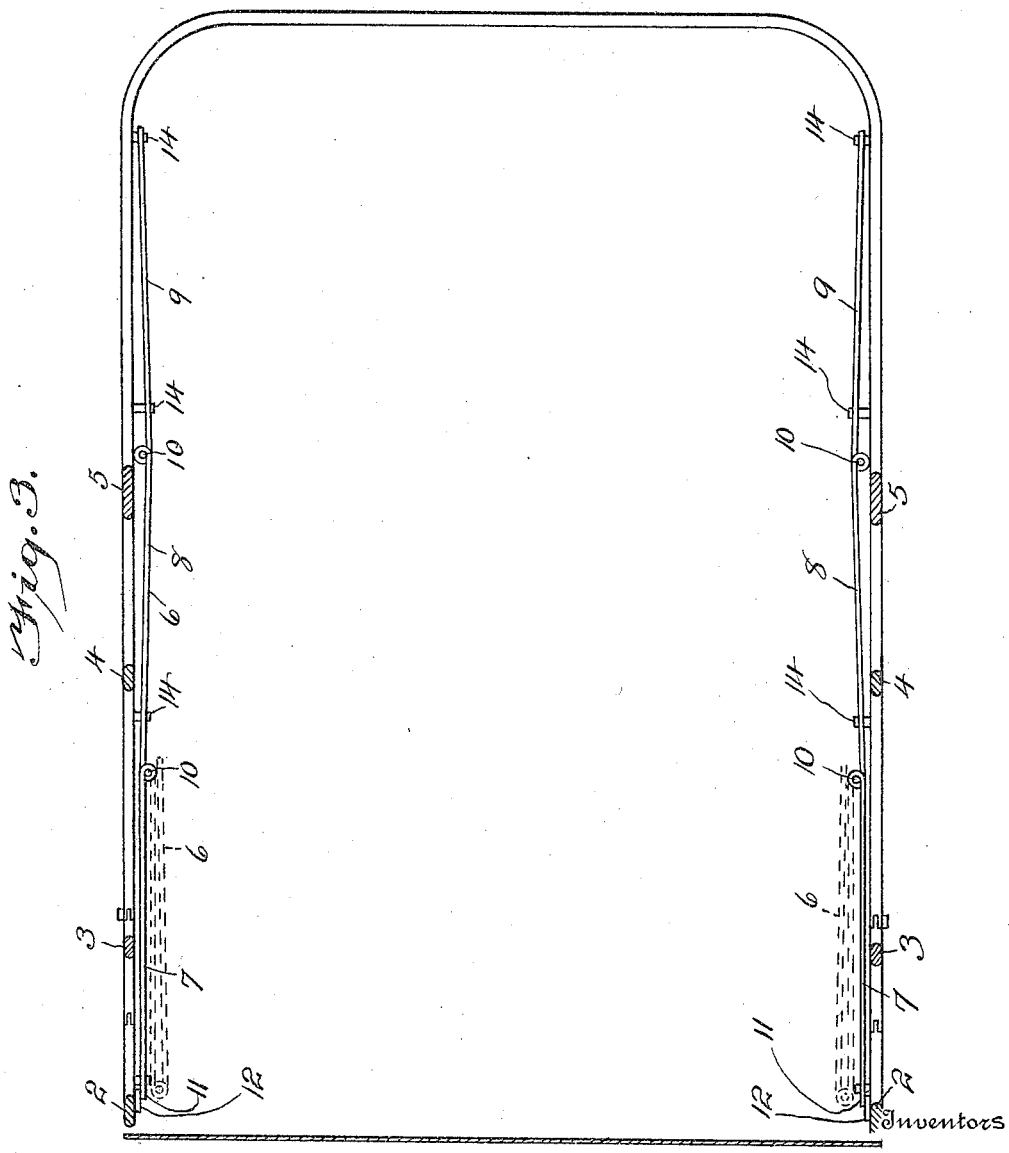

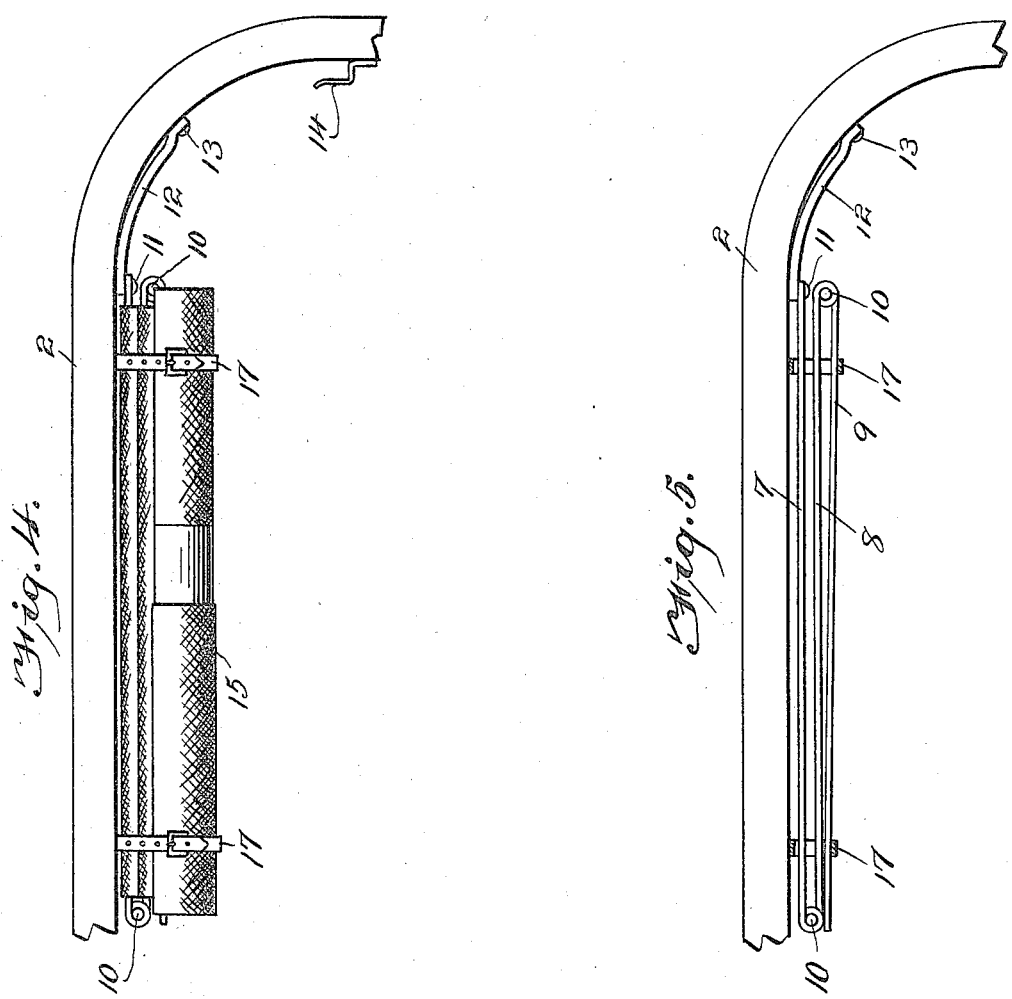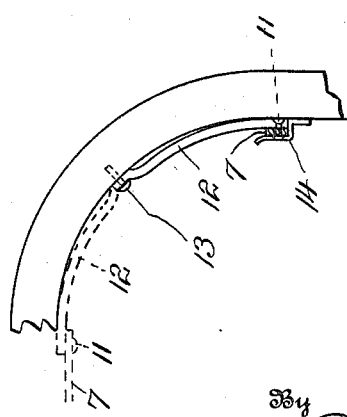

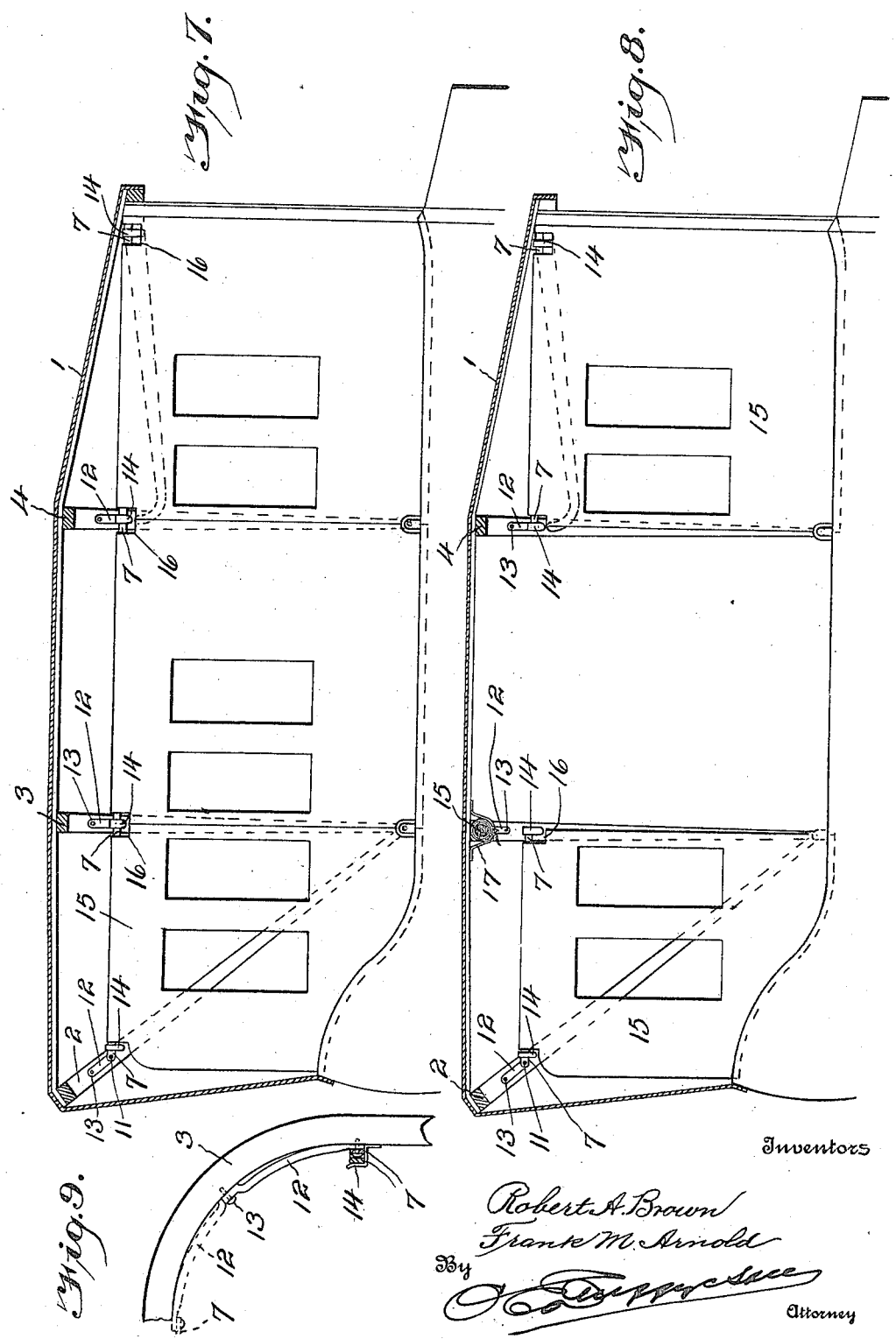

UNITED STATES PATENT OFFICE.

ROBERT A. BROWN AND FRANK M. ARNOLD, OF PONTIAC, MICHIGAN.

AUTOMOBILE-CURTAIN-HANGING DEVICE.

1,236,143.  Specification of Letters Patent.  Patented Aug. 7, 1917.

Application filed December 13, 1915. Serial No. 66,508.

*To all whom it may concern:*

Be it known that ROBERT A. BROWN and FRANK M. ARNOLD, citizens of the United States, residing at the city of Pontiac, in the county of Oakland and State of Michigan, have invented certain new and useful Improvements in Automobile-Curtain-Hanging Devices; and they do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in automobile curtains and devices for hanging the same, and has for its object to provide a simple, inexpensive and effective arrangement for supporting and hanging automobile curtains to the top of an automobile, and for folding and storing the same when the curtains are not in use.

With this object in view the invention consists in the novel construction and arrangement of the curtain hanging device, and the invention consists in the novel arrangement of attaching the curtains to the hanging device.

The invention further consists in the construction and arrangement for holding and storing the curtains when the same are not in operative position.

Referring to the accompanying drawings:

Figure 1 is a vertical longitudinal sectional view through an automobile top, illustrating the curtains in operative position.

Fig. 2 is a similar view, illustrating the curtains in a partially folded position.

Fig. 3 is a horizontal sectional view taken on line 3—3 of Fig. 1.

Fig. 4 is a fragmentary elevation of the rear bow of the top, illustrating the curtains in a folded position. Fig. 5 is a similar view, illustrating the curtain hanging device in a folded position with the curtains removed therefrom.

Fig. 6 is a fragmentary elevation of the rear bow, illustrating the position of the pivoted hanger member in full and dotted lines.

Fig. 7 is a vertical longitudinal sectional view through an automobile top, illustrating a modification, Fig. 8 is a similar view illustrating the central curtain in folded position and, Fig. 9 is a fragmentary elevation of one of the central bows as illustrated in modifications shown in Figs. 7 and 8.

Like numerals of reference indicate the same parts throughout the several figures, in which—

1 indicates an automobile top having the rear bow 2 and the usual intermediate bows 3, 4 and 5.

6 indicates the curtain hanging device which preferably includes three sections 7, 8 and 9 hinged together at 10, the rearmost section 7 being pivoted at 11 to the hanger 12 which in turn is pivoted at 13 at the center of the radius of the rear bow 2, in such manner that said hanger 12 may be swung on its pivot 13 into the position shown in full and dotted lines in Fig. 6. Secured to the bows in the manner as shown in Fig. 2 are spring clips 14 which receive the hanger device in the manner as shown in Fig. 3 when the hanger device is in an unfolded and in an extended position.

15 indicates the curtains which may be one continuous curtain as illustrated in Fig. 1, or which may be in sections according to the size and character of the top and the car to which the same are applied, the said curtain 15 being provided with a loop at its upper longitudinal edge through which loop the sections of the hanging device are passed, in the manner as shown in Fig. 1, said curtain 15 being provided with suitable apertures 16 to permit free movement of the hanger hinges and to permit ready application of the hanging device to the spring clips 14.

Attached to the rear bow 2 as shown in Fig. 4 are suitable straps 17 for the purpose of securing the curtains in a folded and rolled position when the same are not in use.

Having thus fully described the several parts of this invention, its operation is as follows:

The curtains being normally folded and rolled as shown in Fig. 4 the same are brought into operative position by unbuckling the straps 17 and in swinging the pivoted hanger 12 from the position shown in Fig. 4 down into position shown in full lines in Fig. 6. This movement of the pivoted hanger 12 brings the rearmost section 7 into the rearmost spring clip 14 as shown in Fig. 6. The intermediate section 6 is then swung on its hinge and entered into its supporting spring clip 14. The foremost section 9 is then swung on its hinge and entered in its supporting spring clip 14, which operation carries the entire curtain 15 into effective operative position, as shown in Fig. 1. If however, it is desired to shield only a portion of the car body such as for instance the rear seat, one or more sections only of the curtain hanger can be swung into open position as is clearly shown in Fig. 2, and as is more particularly illustrated in dotted lines in Fig. 3.

By means of this construction automobile top curtains are not only conveniently and safely carried in the top of an automobile without danger of damage or injury to the curtains, but they are at the same time maintained in convenient position for immediate use and can be hung in effective operative position in a minimum amount of time, and with the least possible effort on the part of the occupants of the car.

It will furthermore be appreciated from the foregoing specification taken in connection with the accompanying drawings, that a curtain hanging device constructed in accordance with this invention presents a particularly strong, durable and rigid arrangement, insuring a proper and pleasing appearance of the curtains, preventing the unsightly and troublesome sagging thereof, and at the same time relieving the top and bows from any undue or uneven strain which is at all times likely to cause a wrinkled, sagging or misshaped top.

It is further evident that automobile curtains hung, folded and rolled in accordance with this invention will greatly outlast and outwear automobile curtains hung, folded and stored in the usual manner, while with this construction the usual flexible lights or curtain windows are preserved from cracking which is at all times a source of annoyance.

As will appear from Figs. 7 and 8 each bow 2, 3 and 4 are provided with a pivoted hanger 12 pivoted at 13 in the manner as heretofore described, to which hangers a section 7 is pivoted in the manner as shown in Fig. 9. In the embodiment the curtains 15 are in sections so that any one or more can be unfolded and swung into operative position as for instance as illustrated in Fig. 8 in which the central curtain is shown folded, and the front and rear curtains in unfolded operative position.

Having thus fully described the invention, it is apparent that the same is susceptible to certain changes in the construction and arrangement of the parts, and we consider ourselves clearly entitled to all such modifications as fall within the limit and scope of the appended claims.

What we claim as new and desire to secure by Letters Patent of the United States is—

1. An automobile curtain hanging device, including a plurality of curtain sections hinged together and foldable one upon the other, a plurality of spring clips for receiving said sections to hold the same in an unfolded extended position, a pivoted hanger to which said plurality of curtain sections are connected to swing transversely at substantially right-angles to their normal extended position and means for holding said plurality of curtain sections in a folded position when the same are swung on said pivoted hanger transversely.

2. An automobile curtain hanging device, including a plurality of sections hinged together to be extended longitudinally of an automobile top and to be folded one on the other, each of said plurality of sections having thereon a curtain, the said curtains being foldable one on the other upon folding of the said longitudinal sections, means for pivotally connecting to a bow of an automobile top, the endmost of said plurality of sections, means for holding the said sections in an unfolded extended position longitudinally of an automobile top, said plurality of sections being capable of being swung when in a folded position transversely of an automobile top, and means for holding and supporting said sections in said transverse position.

In testimony whereof, we affix our signatures, in presence of two witnesses.

ROBERT A. BROWN.
FRANK M. ARNOLD.

Witnesses:
 ELMER E. BLAKESLEE,
 W. F. BLAKESLEE.

Copies of this patent may be obtained for five cents each, by addressing the "Commissioner of Patents, Washington, D. C."